United States Patent
Sagerer-Foric et al.

(10) Patent No.: US 11,939,713 B2
(45) Date of Patent: Mar. 26, 2024

(54) METHOD FOR RECOVERING SOLVENT AND CELLULOSE IN THE PRODUCTION OF CELLULOSIC SPUN-BONDED NONWOVEN FABRICS

(71) Applicant: LENZING AKTIENGESELLSCHAFT, Lenzing (AT)

(72) Inventors: Ibrahim Sagerer-Foric, Vocklabruck (AT); Markus Malzner, Ungenach (AT); Martin Lichtenthal, Attersee (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 486 days.

(21) Appl. No.: 17/299,828

(22) PCT Filed: Dec. 4, 2019

(86) PCT No.: PCT/EP2019/083693
§ 371 (c)(1),
(2) Date: Dec. 13, 2021

(87) PCT Pub. No.: WO2020/115142
PCT Pub. Date: Jun. 11, 2020

(65) Prior Publication Data
US 2022/0106719 A1    Apr. 7, 2022

(30) Foreign Application Priority Data

Dec. 5, 2018 (EP) .................................. 18210510

(51) Int. Cl.
*D04H 3/013* (2012.01)
*C08J 11/02* (2006.01)
(Continued)

(52) U.S. Cl.
CPC .............. *D04H 3/033* (2013.01); *C08J 11/02* (2013.01); *D01D 5/06* (2013.01); *D01D 13/02* (2013.01); *D04H 3/013* (2013.01); *C08J 2301/02* (2013.01)

(58) Field of Classification Search
None
See application file for complete search history.

(56) References Cited

U.S. PATENT DOCUMENTS

| | | | |
|---|---|---|---|
| 3,489,241 | A | 1/1970 | Steinberg |
| 3,884,907 | A | 5/1975 | Laurance et al. |

(Continued)

FOREIGN PATENT DOCUMENTS

| | | | |
|---|---|---|---|
| AT | 503625 A1 | 11/2007 | |
| EP | 3088585 A1 | 11/2016 | |

(Continued)

*Primary Examiner* — Xiao S Zhao
*Assistant Examiner* — Nicholas J Chidiac
(74) *Attorney, Agent, or Firm* — Venable LLP

(57) ABSTRACT

A plant (1) for the production of spunbonded nonwoven (8), comprising a spinning solution production (3), a spinning system (2), a device (6) for the delivery of coagulation liquid, at least one conveying device (7, 9) for depositing the spunbonded nonwoven (8), and a collecting device (13) for the spunbonded nonwoven (8), wherein at least one discharge device (14) is provided between the device (6) for the delivery of coagulation liquid and the collecting device (13) for the spunbonded nonwoven (8).

3 Claims, 2 Drawing Sheets

Figure 1:
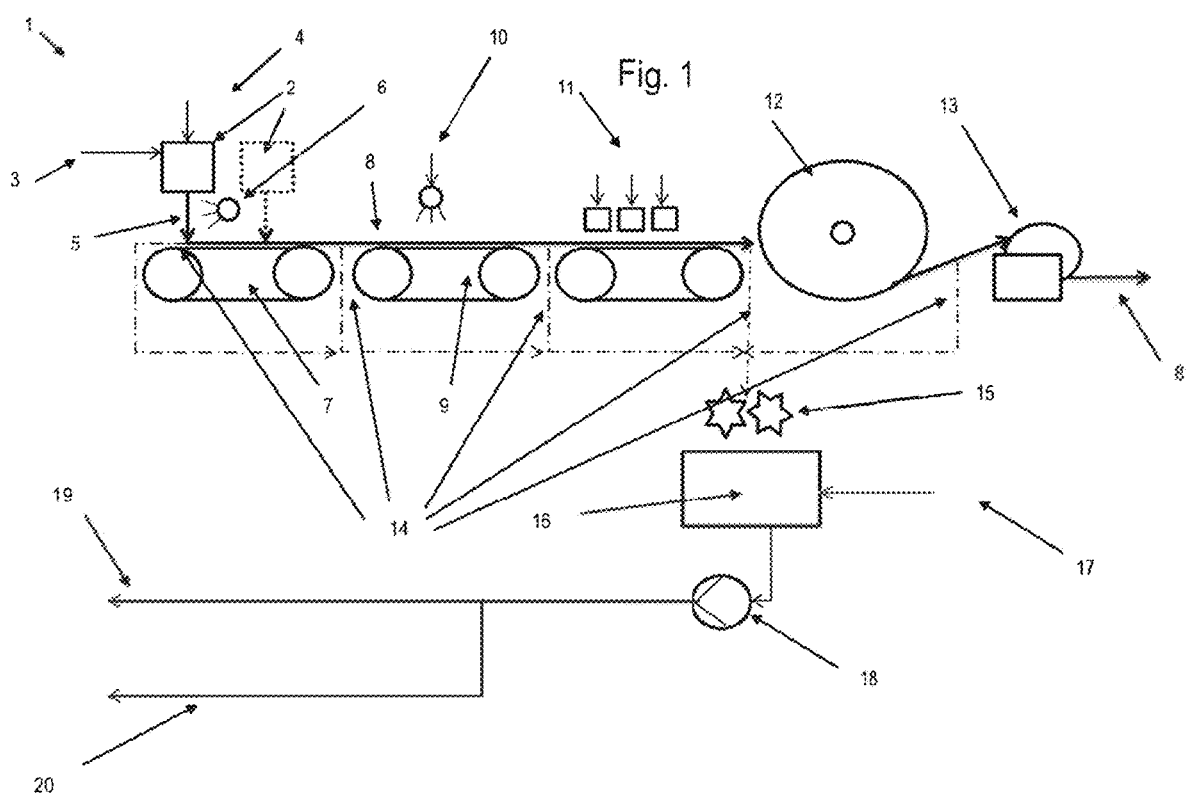

(51) Int. Cl.
    *D01D 5/06*     (2006.01)
    *D01D 13/02*     (2006.01)
    *D04H 3/033*     (2012.01)

(56) References Cited

U.S. PATENT DOCUMENTS

| | | |
|---|---|---|
| 4,380,570 A | 4/1983 | Schwarz |
| 4,434,204 A | 2/1984 | Freudenberg |
| 5,080,569 A | 1/1992 | Gubernick et al. |
| 5,695,377 A | 12/1997 | Triebes et al. |
| 6,306,334 B1 | 10/2001 | Luo et al. |
| 6,358,461 B1 | 3/2002 | Law et al. |
| 8,282,877 B2 | 10/2012 | White et al. |
| 8,366,988 B2 | 2/2013 | Chou et al. |
| 9,982,367 B2 | 5/2018 | Goretzki et al. |
| 11,124,899 B2 * | 9/2021 | Sun .......................... D01D 5/06 |
| 11,371,173 B2 * | 6/2022 | Einzmann .............. D04H 3/013 |
| 2009/0186189 A1 | 7/2009 | White et al. |
| 2011/0156303 A1 | 6/2011 | Chou et al. |
| 2014/0008577 A1 | 1/2014 | Chou et al. |
| 2016/0312384 A1 | 10/2016 | Goretzki et al. |
| 2019/0264356 A1 | 8/2019 | Einzmann et al. |
| 2019/0292683 A1 * | 9/2019 | Sun .......................... D01F 13/02 |
| 2021/0292949 A1 * | 9/2021 | Sagerer-Foric ........ D04H 3/013 |

FOREIGN PATENT DOCUMENTS

| | | |
|---|---|---|
| GB | 2114052 A | 8/1983 |
| WO | 2018/071928 A1 | 4/2018 |

\* cited by examiner

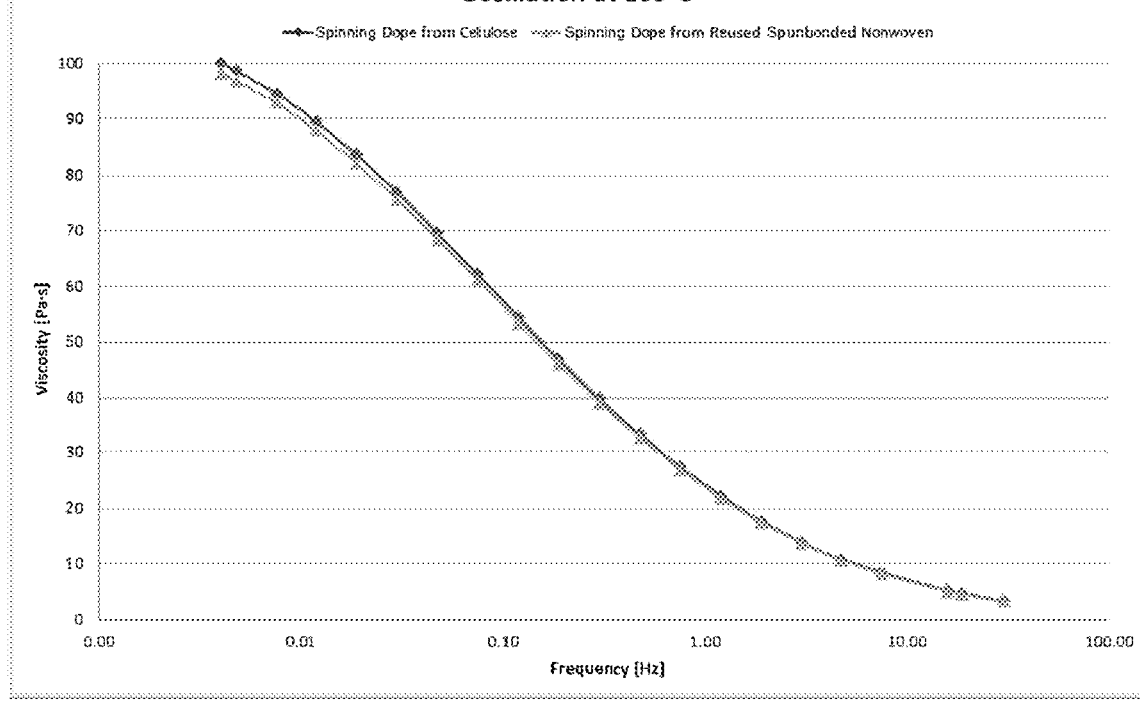

METHOD FOR RECOVERING SOLVENT AND CELLULOSE IN THE PRODUCTION OF CELLULOSIC SPUN-BONDED NONWOVEN FABRICS

The present application is a national-stage entry under 35 U.S.C. § 371 of International Patent Application No. PCT/EP2019/083693, published as WO 2020/115142 A1, filed Dec. 4, 2019, which claims priority to EP 18210510.6, filed Dec. 5, 2018, the entire disclosure of each of which is hereby incorporated by reference.

BACKGROUND OF THE INVENTION

The present invention relates to a plant for the production of spunbonded nonwoven comprising a spinning system, a device for delivering coagulation liquid, at least one conveying device for depositing the spunbonded nonwoven and a collecting device for the spunbonded nonwoven. Furthermore, the invention relates to a method of recycling solvent or cellulose in a plant for the production of spunbonded nonwoven, wherein spinning dope filaments are extruded from a spinning system, deposited in a drawn state to form a spunbonded nonwoven and collected later.

For many years, spunbonded nonwovens have been produced according to the spunbond process or the meltblown process. In the spunbond process as described, for example, in GB 2 114 052 and EP 3 088 585, filaments are extruded through a nozzle and taken off and drawn by a drawing unit positioned underneath. In contrast, in the meltblown process as described, for example, in U.S. Pat. Nos. 5,080,569, 4,380,570 and 5,695,377, the extruded filaments are already entrained and drawn by hot, fast process air when they emerge from the nozzle.

In both technologies, the filaments are deposited on a deposition surface, for example, a perforated conveyor belt, in random orientation to form a nonwoven fabric, are conveyed to finishing steps and, finally, are wound up as nonwoven rolls.

The known methods and devices have been developed mainly for the production of synthetic filaments such as, for example, polypropylene, and previous publications are mainly concerned with the nozzles, the raw material used and the deposition systems required for the deposition of the nonwoven. In fact, the economically sensible and safety-compliant operation of production plants requires a closer look at the operating conditions in spunbonding plants. During the start-up of thermoplastic spunbonding plants, the extruded filaments are, for example, either collected by a device underneath the spinning system and disposed of, or deposited on a so-called carrier web. Since the carrier web was unrolled prior to the deposition of the nonwoven, on the one hand, the conveyor belt is protected from damage caused by hot filaments and also, on the other hand, the freshly extruded filaments are already transported and wound up via the solidification and, optionally, drying devices arranged downstream. On the one hand, it is prevented that the deposition conveyor belt is damaged by hot filaments during piecing and, on the other hand, the threading of the spunbonded nonwoven occurs automatically. As soon as the desired quality of the spunbonded nonwoven is achieved, the carrier web is cut off or, respectively, torn off before the spunbonded nonwoven is deposited. The spunbonded nonwoven is then deposited directly and immediately on the deposition surface. Before the plant is turned off, the carrier web is unrolled again in order to be able to repeat the previously described starting process for the next start-up. In known spunbonding plants for thermoplastic spunbonded nonwoven, special attention is paid to the handling of the hot melt and the protection of the conveying device during start-up, shutdown and, in case of problems, during the production of the spunbonded nonwoven.

In contrast to the spunbond process and the meltblown processes for thermoplastics, which are already very well-known, the nonwoven transport for the production of cellulosic spunbonded nonwovens, for example, from a lyocell spinning dope, must solve additional problems. The production of cellulosic spunbonded nonwovens using spunbond technology is described, for example, in U.S. Pat. No. 8,366,988, and that according to meltblown technology is described in U.S. Pat. Nos. 6,358,461 and 6,306,334. In these processes, the lyocell spinning dope is drawn like in the previously known spunbond and meltblown processes, but the filaments are additionally contacted with a coagulant prior to the deposition of the nonwoven in order to regenerate the cellulose and to produce dimensionally stable filaments. Due to the turbulence of the air, the wet filaments are deposited as a nonwoven fabric in random orientation.

For the production of cellulosic spunbonded nonwovens, solvents are used which must be recycled. In addition, the spinning dopes or, respectively, the lyocell spinning dopes that have been produced are flammable and can cause damage to downstream plant parts so that the start-up and shutdown procedure may not occur as in thermoplastic spunbonding plants. The hot spinning dope filaments, which initially are still coarse, cannot simply be deposited on a carrier web and conveyed to the winder via the dryer. It has been shown that, during the start-up of the plant, especially with small amounts of drawing air, the extruded filaments are still so coarse that, even after the washing process described in WO 2018/071928 A1, they will exhibit such a high amount of solvent residues that solvent will be lost during the further processing of the spunbonded nonwoven. Downstream plant parts such as the hydroentanglement, the dryer and the winder described in AT 503 625 are furthermore polluted and corrode due to the solvent. In extreme cases, the solvent-laden spunbonded nonwoven might still largely consist of spinning dope and start to burn in the dryer.

The loss of the solvent and of plant parts damaged by corrosion and fire constitutes a considerable economic risk. Especially in the production of cellulosic spunbonded nonwovens, the loss of the solvent and the contact of the solvent with downstream equipment should be avoided for safety, economic and environmental reasons.

As already mentioned, the focus of previous publications regarding methods of producing thermoplastic spunbonded nonwovens (as described in U.S. Pat. No. 3,849,241) primarily lies on spinning systems used for meltblown and spunbond. Although U.S. Pat. Nos. 6,358,461 and 8,282,877 describe the production of cellulosic spunbonded nonwovens and U.S. Pat. No. 8,366,988 also gives details about raw material and product recirculation, the prior art does not provide any information about the operation mode during start-up and shutdown of the plant, in case of production problems and about the recycling of solvent and cellulose during the operation of a cellulosic spunbonding plant.

BRIEF DESCRIPTION OF THE INVENTION

Therefore, it is the object of the present invention to avoid the disadvantages described above. In particular, the loss of solvent should be minimized in the initially mentioned plant and in the initially mentioned method, and operational reliability of downstream plant parts is to be ensured.

The object is achieved by a plant for the production of spunbonded nonwoven, comprising
- a spinning solution production,
- a spinning system,
- a device for the delivery of coagulation liquid,
- at least one conveying device for depositing the spunbonded nonwoven, and
- a collecting device for the spunbonded nonwoven,
- characterized in that at least one discharge device is provided between the device for the delivery of coagulation liquid and the collecting device for the spunbonded nonwoven.

Furthermore, the object is achieved by a method of recycling solvent or cellulose in a plant for the production of spunbonded nonwoven, wherein spinning dope filaments are extruded from a spinning system, deposited in a drawn state to form a spunbonded nonwoven and collected later, wherein spunbonded nonwoven deposited during the start-up of the plant, during the shutdown of the plant or in case of operational problems of the plant is discharged prior to the collection, wherein (a) the solvent is removed from the discharged spunbonded nonwoven and/or wherein (b) the discharged spunbonded nonwoven is supplied to the spinning solution production.

In order to discharge the solvent-laden spunbonded nonwoven during start-up, shutdown or in case of operational problems during the production (spinning defects, accumulation of coarse fibres, spunbonded nonwoven still consisting of spinning dope, . . . ) and to be able to recycle the solvent, as well as to avoid pollution and, for example, fire hazard during hydroentanglement, in a drying device or in the collecting device, the plant according to the invention achieves the additional object of discharging this solvent-laden spunbonded nonwoven, which does not exhibit the desired properties, and of feeding it back to the production process.

Using the example of the production of a spunbonded nonwoven from a lyocell spinning dope, it has been shown that the discharged pieces of spunbonded nonwoven can be supplied to further purification steps during NMMO recycling and, subsequently, can be filtered, decanted, pressed or centrifuged, for example, so that an NMMO solution is again formed, which can be purified, evaporated and added to the spinning dope production. In accordance with the invention, NMMO, which would have been lost during the start-up and shutdown of the plant or in case of production problems, could be discharged specifically from the production plant and subsequently recycled. It has been shown that, upon solid/liquid separation, the remaining cellulose can also be reused for the production of spinning dope, rather than being disposed of.

A further advantage of the method according to the invention is the protection of downstream plant parts, in addition to the economically and environmentally improved operation of the spunbonding plant as a result of the recycling of solvent and cellulose. Since the solvent-laden spunbonded nonwoven is discharged after the transport device or after the washing device or after the solidification device, it is possible to prevent the flammable solvent or, respectively, the spinning dope from coming into contact with the hot dryer surface of a drying device.

If the spunbonded nonwoven is discharged by means of a water jet prior to solidification, it can also be prevented that solvent enters the water cycle of the hydroentanglement, which may cause corrosion to parts of the plant and to nozzle strips at this point.

A further advantage turns out to be the possibility of discharging the spunbonded nonwoven at several points during the start-up and the shutdown of the plant, but also in case of production malfunctions, especially at high speeds. If, for example, the spunbonded nonwoven winds around a vacuum drum or a deflection roller during hydroentanglement, the spunbonded nonwoven can be torn off and discharged upstream, the rate of hydroentanglement can be reduced, entanglement can be eliminated and the plant can be restarted without having to stop the entire spinning process or even the spinning dope production. Especially in the production of cellulosic spunbonded nonwovens it has become apparent that the spinning dope production should be operated constantly in order to achieve a uniform product quality. Downtimes could be minimized because of the method according to the invention, since adjustments can be made to downstream plant parts without having to turn off or throttle the spinning dope system and the spinning system. Only the speeds of the transport device are adjusted, the spunbonded nonwoven is discharged before the part of the plant on which work is performed, and the NMMO is recycled from the discharged spunbonded nonwoven—as already described, or the discharged spunbonded nonwoven is suspended and returned directly to the spinning dope production.

For ease of description, in the context of the invention, a spunbonded nonwoven is understood to be, during normal operation, on the one hand, a nonwoven structure made of regenerated cellulose filaments, optionally stuck together at intersection points, in the range of a filament diameter from 0.1 µm to 250 µm and with <500 mg/kg solvent. On the other hand, a spunbonded nonwoven is understood to be, during start-up, shutdown or in case of production malfunctions, a planar assembly made of spinning dope filaments with a diameter of 0.1 to 50,000 µm and a solvent concentration of >500 mg/kg up to a few million mg/kg, which have been regenerated partially or not at all. Depending on the operation mode, the actual state may also be between the two above-mentioned examples.

With regard to the system, there are numerous advantageous embodiment variants.

The extruded spinning dope filaments or also filaments which have already been regenerated can be discharged against the transport direction after the deposition. If the spinning dope does not yet have the desired quality or if problems with downstream transport devices must be eliminated, the discharge can take place immediately after the extrusion from the spinning system or, respectively, before the transport device by having the transport device move backwards.

Furthermore, the plant may comprise at least one washing system, with a discharge device being provided between the transport device and the washing system.

Furthermore, the plant may comprise at least one solidification system, with a discharge device being provided between the transport device and the solidification system.

Furthermore, the plant may comprise a drying device, with a discharge device being provided between the transport device or, respectively, the solidification system arranged upstream and the drying device.

Furthermore, the plant may comprise a discharge device downstream of the drying device.

It is preferably provided that the transport device is multipart and a discharge device is provided between two parts of the transport device. Thus, the transport device may, for example, be a conveyor belt. In the simplest case, it is a multipart conveyor belt, with the discharge device being arranged between two conveyor belt parts.

In the simplest case, the discharge device may have an opening for the spunbonded nonwoven to fall through. In one embodiment variant, the discharge device is designed as a shaft under the gap between parts of the transport device. The gap between the conveying devices may be between 2 and 200 cm, preferably between 5 and 100 cm, more preferably between 10 and 50 cm. The shaft can cover either the entire width of the transport device or only a part thereof. The spunbonded nonwoven can fall passively into the shaft and toward the shredding device or can be taken actively to the shredding device by air nozzles, water nozzles or other conveying devices known to those skilled in the art.

The discharged solvent-laden spunbonded nonwoven can be reused. For this purpose, a shredding device can be provided, wherein the input of the shredding device is connected to the discharge device. The solvent-laden spunbonded nonwoven can then be shredded.

In one embodiment variant, it is provided that the output of the shredding device is connected to the spinning solution production. In this case, the shredded material can be returned to the spunbonding process.

Optionally, a further discharge device can be provided between the shredding device and the spinning solution production. In this case, too much amount of shredded material can be retained, or contaminated material can be eliminated altogether.

It is preferably provided that a suspension container is provided between the shredding device and the spinning solution production. Thus, the shredded material can be prepared optimally for the next spinning process.

The positions for discharging spunbonded nonwoven may be after the spinning system, after the deposition conveyor belt, after the washing, after solidification and after the dryer so as to reuse, for example, edge cut material for the spinning dope production.

Each discharge device can be followed by at least one shredding device and a suspension container. Depending on the plant design, further embodiment variants are possible.

The discharged spunbonded nonwoven can also be transported from several discharge devices to a shredding device via conveying devices.

The shredding device may comprise one suspension container or several suspension containers which are filled alternately. Thus, the suspension containers can be operated either continuously or discontinuously, depending on the technical equipment design. A suspension pump can continue the suspension.

For low cellulose contents, the suspension pump can be designed, for example, as a gear pump or a worm wheel pump. At high cellulose contents, a screw conveyor, a metering screw, a conveyor belt or a proportioning belt weigher may also be used, for example, for the metering of the recycled cellulose for a new spinning dope production.

The discharge process can take place at nonwoven transport speeds of between 5 and 1000 m/min, preferably between 10 and 500 m/min, more preferably between 15 and 250 m/min.

The conveying devices may also be rotating rollers or drums. Depending on the layout of the transport device, the discharge devices are adjusted such that the spunbonded nonwoven is discharged at those points and the method according to the invention can be implemented.

With regard to the method, it may furthermore be provided that the discharged spunbonded nonwoven is suspended again and mixed with fresh pulp and fresh solvent before it is supplied to the spinning solution production.

It is preferably provided that the shredded spunbonded nonwoven is mixed with solvent before it is supplied to the spinning solution production. Surprisingly, the prepared suspension could even be supplied directly to the spinning dope production and, thus, the already used NMMO and the cellulose which had already been processed into spunbonded nonwoven could be re-dissolved to spinning dope and spun, without any limitations being apparent with regard to spinnability or product characteristics.

The method according to the invention can be used for the production of cellulosic spunbonded nonwovens in order to recover the solvents used for dissolving the cellulose, for example, tertiary amine oxides or ionic liquids.

DETAILED DESCRIPTION OF THE INVENTION

In the present invention, a method and a plant are provided which make it possible to use the distances or, respectively, gaps between two plant parts or transport devices for discharging solvent-laden spunbonded nonwoven, to shred and to suspend the discharged spunbonded nonwoven and to either supply the produced suspension subsequently to solvent processing or to add it directly to the spinning dope production.

The method according to the invention enables an economically, environmentally, safety and operationally improved operation of a spunbonding plant for the production of cellulosic spunbonded nonwovens, since the spunbonded nonwoven can be discharged and adjustments can be made to downstream equipment without switching off the spinning dope production or the spinning system. Subsequently, the solvent can be recycled and contamination of downstream equipment can be prevented and, thus, the risk of corrosion and fire can be minimized.

For a better illustration of the invention, the essential features are depicted based on preferred embodiments of the method according to the invention, with reference to the following figures:

FIG. 1 schematically shows a plant according to the invention.

FIG. 2 shows the viscosity of a spinning dope from fresh pulp in comparison to reused cellulose from a spunbonded nonwoven.

FIG. 1 shows a plant 1 according to the invention, with the process stages also being explained with reference to the plant 1. By means of the spinning system 2, extruded and drawn spinning dope filaments 5 are deposited to form a spunbonded nonwoven 8 and are discharged at several discharge devices 14 via an interruption of the main process flow. During normal operation, the filaments 5 can be sprayed with a coagulation liquid from a device 6 for the delivery of coagulation liquid in order to regenerate the cellulose and to stabilize the shape of the filaments 5 before the process air 4 and the filaments 5 impinge on the conveying device 7 in the form of a conveyor belt and the spunbonded nonwoven 8 is formed. The spunbonded nonwoven 4 is then washed in the main process flow in a washing device 10, optionally solidified in a solidification system 11, dried in the drying device 12 and wound up into rolls in the collecting device 13.

It has been shown that during start-up, shutdown or in case of production problems, for example, in case of a failure of the device 6 for the delivery of coagulation liquid or of the washing device 10, more than 500 ppm NMMO, in some cases more than 5000 ppm NMMO, in extreme cases more than 50,000 ppm NMMO, remain in the spunbonded nonwoven during the production of spunbonded nonwovens from lyocell spinning dope. Without the method according to the invention, the solvent-laden spunbonded nonwoven would be transported to the collecting device 13 via the solidification system 11 and the drying device 12. Over an extended period of time, the NMMO accumulates in the water cycle of the solidification system 11 and may cause corrosion of plant parts and solidification nozzles. During prolonged operation, the NMMO may accumulate at the drying device 12 and cause fires in the drying device 12. In all cases, NMMO is lost, which, in addition to the above-mentioned safety problems, is neither economically nor environmentally acceptable.

It has been shown that, in case of productivities of the spinning system 2 of between 10 kg/h/m and 1000 kg/h/m cellulose throughput, the solvent losses are so high that a new method must be developed for solving the problems which have already been described.

According to the invention, the gaps between the conveyor belts 7, 9 are used to the extent that discharge devices 14 (not shown in detail) can be installed which allow the solvent-laden spunbonded nonwoven to be discharged. According to the invention, higher flexibility results for the plant operators already from the removal from the main process flow, since they will be able to perform activities on downstream plant parts without having to turn off or throttle the spinning solution production 3 and the spinning system 2 beforehand.

The discharged spunbonded nonwoven is shredded in a shredding device 15 to form pieces of spunbonded nonwoven and is suspended in the suspension container 16 by addition of liquid 17 to such an extent that it can be conveyed, for example, by a feed pump 18 either via the line 19 to the NMMO recovery (not shown in detail) or via a line 20 to the spinning solution production 3 (not shown in detail). It has been shown that the discharged spunbonded nonwoven can be mixed to a transportable suspension by the shredding step and by mixing with liquid. It is this step which enables the recycling of NMMO or the addition to the spinning solution production.

The discharge devices 14 may be located downstream of the spinning dope line, downstream of the spinning system 2, upstream or downstream of the transport device 7 and upstream or downstream of the transport device 9 associated to the washing device 10. In addition, discharge devices 14 may be located between the solidification system 11 and the drying device 12. Discharge devices 14 may also be arranged downstream of the drying device 12 and upstream of the collecting device 13 in order to discharge products of poor quality, to supply them to the recycling and to process them once more into the spinning dope. Depending on the process control and the plant layout, other positions for the discharge device 14 are also possible. A plant 1 may therefore have one or several discharge devices 14. The moisture load of the discharged spunbonded nonwovens per kg of cellulose may be from 0.1 kg/kg to 10 kg/kg in the area of the washing and from 0 to 4 kg/kg in the area after drying.

The discharged spunbonded nonwoven is guided to the shredding device 15 via the discharge device 14. For example, the shredding device 15 may be a mill, preferably a cutting mill, which can shred 10 to 5000 kg/h, preferably 100 to 2000 kg/h, more preferably 200 to 1000 kg/h of spunbonded nonwoven. The shredded pieces of spunbonded nonwoven have a length ranging from 10 µm to 100 mm, preferably from 0.1 mm to 50 mm, more preferably from 1 mm to 10 mm. Depending on the strength and desired degree of shredding of the spunbonded nonwoven, other shredding devices known to a person skilled in the art may also be used.

The shredded pieces of spunbonded nonwoven are mixed with liquid 17 in the suspension tank 16 and blended to form a transportable suspension. The suspension container 16 may comprise a stirrer for increasing the homogeneity of the suspension. In one embodiment variant, the suspension container may also be heated in order to improve the water absorption of the cellulose and to increase the swelling.

The liquid 17 used for the suspension may be demineralized water or a solution of the solvent used for the production of the spinning dope and water. If the spunbonded nonwoven is produced from a lyocell spinning dope, the liquid 17 for the suspension may have between 0 and 85% NMMO, preferably 10 to 80% NMMO, more preferably between 20 and 78% NMMO. The prepared suspension has a cellulose content of between 1 to 95%, preferably of 2 to 50%, more preferably of 3 to 30%. Since the suspensions that are prepared are pumped either to the solvent recycling or as an additive to the spinning dope production and the viscosity of the suspension highly depends on the cellulose content and the type of solvent, the cellulose content and the concentration of the solvent must be adjusted depending on the position of the discharge device (moisture content of the spunbonded nonwoven at this point) and the use of the suspension. It has been shown that the cellulose content of the suspension should preferably be below 20% when the suspension is transported to the NMMO recycling, since later purification steps, the solid/liquid separation and, subsequently, the NMMO attenuation can be performed better in the NMMO processing cycles of the lyocell process, which already exist anyway. If the suspension is to be reused for the production of spinning dope, higher cellulose contents of >20% are beneficial, since the cellulose content can be adjusted better in the eventual spinning dope.

FIG. 2 shows that the viscosity of the spinning dope deviates only slightly from the viscosity of a spinning dope made of fresh cellulose, despite the renewed shredding and dissolving of the spunbonded nonwoven (measured by means of the rheometer Kinexus from the company Malvern Messsystem CP4/40, oscillation measurement at 100° C. with 0.004 and 30 Hz, evaluation with rSpace for Kinexus, both samples measured with the same pulp and moisture contents). Thus, by means of the method according to the invention, spunbonded nonwovens that have already been produced and discharged can be reused. Thus, for example, lyocell spinning dopes with a pulp content of 4 to 17% can be produced from 100%, preferably 1 to 50%, more preferably 2 to 30%, of reused cellulose made of recycled spunbonded nonwoven.

The invention claimed is:

1. A method of recycling solvent or cellulose in a plant for the production of a spunbonded nonwoven, comprising: extruding spinning dope filaments from a spinning system depositing and collecting the filaments, in a drawn state, to form a spunbonded nonwoven, wherein the spunbonded nonwoven deposited during a start-up of the plant, during a shutdown of the plant, or in case of operational problems of the plant is discharged prior to collection, wherein at least (a) the solvent is removed from the spunbonded nonwoven or (b) the spunbonded nonwoven is supplied to the spinning solution production.

2. The method according to claim 1, wherein the spunbonded nonwoven is shredded before it is supplied to the spinning solution production.

3. The method according to claim 1, wherein that the spunbonded nonwoven is mixed with solvent before it is supplied to the spinning solution production.

\* \* \* \* \*